Patented Oct. 22, 1929

1,732,371

UNITED STATES PATENT OFFICE

MARTIN LUTHER AND KURT PIEROH, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PURIFYING OIL

No Drawing. Application filed June 29, 1927, Serial No. 202,456, and in Germany July 5, 1926.

In the purification or separation of fatty or mineral oils, use is largely made of processes which are carried on, without distillation, by extraction or separation with the aid of solvents, as for example, the de-acidification of oils with the aid of alcohols, the elimination of paraffin from tars with the aid of acetone, the refining of lubricating or insulating oils with the aid of methanol and the like.

We have now found that the formates of the lower alcohols of the fatty series, or mixtures of the same, may be used with advantage as solvents for purifying or separating fatty or mineral oils, or the distillation of hydrogenation products from coal and the like. Special advantage is achieved by the use of methyl formate, which may, for example, be easily prepared from methyl alcohol and carbon monoxid. Owing to its low boiling point, this solvent can be separated from the extracts in a very simple manner. For example the oil to be purified is extracted once or, if necesary, several times with methyl formate at room temperature, whereupon the solution of methyl formate containing the impurities, such as nitrogenous or sulfur bearing compounds or acids, resins and the like, is separated and worked up by distilling off the methyl formate. The methyl formate can also be used when it contains water.

The following examples will further illustrate the nature of the said invention but the invention is not limited to the examples.

Example 1

Sesamum oil containing 10 per cent of free acids is treated three times with thrice its own weight of methyl formate containing 5 per cent of water. This treatment reduces the acid content to 0.2 per cent, the acids being taken up by the formate, which solution is separated after the said treatment.

Example 2

A distillate from Mexican crude oil is shaken up several times with its own volume of methyl formate. The resulting oil is light in color, no longer turns dark afterwards, and is entirely free from the unpleasant smell attaching to the original product. The sulfur content is reduced from 2.3 per cent to 0.6 per cent.

Example 3

An oily residue obtained by catalytic hydrogenation under pressure, of a crude rock oil and separated from the lower fractions by distillation, is treated with methyl formate in excess, heating and stirring being employed if necessary. On the evaporation of the solvent, the dissolved portion represents a valuable resin, of golden-yellow color.

What we claim is:

1. The process of purifying oils which consists in treating same with a formate of a low aliphatic alcohol as an extraction liquid and separating the solution of formate containing the impurities from the purified oils.

2. The process of purifying hydrocarbon oils which consists in treating same with a formate of a low aliphatic alcohol as an extraction liquid and separating the solution of formate containing the impurities from the purified oils.

3. The process of purifying products of the destructive hydrogenation of carbonaceous materials, which consists in treating same with a formate of a lower aliphatic alcohol as an extraction liquid and separating the solution of formate containing the impurities from the purified oils.

4. The process of purifying oils which consists in treating same with methyl formate as an extraction liquid and separating the solution of formate containing the impurities from the purified oils.

5. The process of purifying hydrocarbon oils which consists in treating same with methyl formate as an extraction liquid and separating the solution of formate containing the impurities from the purified oils.

6. The process of purifying products of the destructive hydrogenation of carbonaceous materials which consists in treating same with methyl formate as an extraction liquid and separating the solution of formate containing the impurities from the purified oils.

In testimony whereof we have hereunto set our hands.

MARTIN LUTHER.
KURT PIEROH.